US006995969B2

(12) United States Patent
Araki et al.

(10) Patent No.: US 6,995,969 B2
(45) Date of Patent: Feb. 7, 2006

(54) ELECTRIC DOUBLE-LAYER CAPACITOR

(75) Inventors: Shuuichi Araki, Ageo (JP); Yoshiaki Yamada, Ageo (JP); Masakazu Sasaki, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 0 days.

(21) Appl. No.: 10/507,424

(22) PCT Filed: Mar. 19, 2003

(86) PCT No.: PCT/JP03/03296

§ 371 (c)(1),
(2), (4) Date: Mar. 15, 2005

(87) PCT Pub. No.: WO03/079382

PCT Pub. Date: Sep. 25, 2003

(65) Prior Publication Data

US 2005/0168918 A1 Aug. 4, 2005

(30) Foreign Application Priority Data

Mar. 19, 2002 (JP) ............................ 2002-075963
Mar. 19, 2002 (JP) ............................ 2002-075967
Mar. 19, 2002 (JP) ............................ 2002-075968

(51) Int. Cl.
*H01G 9/00* (2006.01)
*H01G 2/08* (2006.01)

(52) U.S. Cl. .................................... 361/502; 361/274.3

(58) Field of Classification Search ................ 361/502, 361/517–519, 522, 274.1, 274.2, 274.3
See application file for complete search history.

(56) References Cited

U.S. PATENT DOCUMENTS 5,530,618 A * 6/1996 Carroll et al. .............. 361/329
6,456,484 B1 * 9/2002 Matsuoka et al. .......... 361/511
6,552,894 B2 * 4/2003 Matsuoka et al. .......... 361/502

FOREIGN PATENT DOCUMENTS

| | | |
|---|---|---|
| JP | 53-66647 | 11/1978 |
| JP | 03-203311 | 9/1991 |
| JP | 05-303977 | 11/1993 |
| JP | 10-106902 | 4/1998 |
| JP | 10-223477 | 8/1998 |
| JP | 2001-068378 | 3/2001 |
| JP | 2001-256934 | 9/2001 |
| JP | 2002-015950 | 1/2002 |
| JP | 2003-007262 | 1/2003 |

* cited by examiner

*Primary Examiner*—Eric W. Thomas
(74) *Attorney, Agent, or Firm*—Rabin & Berdo, PC

(57) ABSTRACT

An electric double layered capacitor is provided, which can ensure a cooling capability by radiating heat to an outside air. The electric double layered capacitor comprises a capacitor cell 1 including a bag-shaped soft case in which a plurality of positive electrodes and negative electrodes, and a separator are received and laminated together with an electrolytic solution, a belt-shaped radiating fin 5*a* which extends from a rim of the soft case, a heat transfer frame 15 to sandwich the radiating fin 5*a*, and a metal hard case 21 for thermal radiation in which a plurality of the capacitor cells 1 are received/laminated through the heat transfer frames 15.

10 Claims, 7 Drawing Sheets

ELECTRIC DOUBLE-LAYER CAPACITOR

FIELD OF THE INVENTION

The present invention relates to an improvement of an electric double layered capacitor used as an electric storage device.

BACKGROUND OF THE INVENTION

Recently, an electric double layered capacitor receives attention as an electric storage device used for, for instance, a hybrid car, a wind power facility or the like, which is rechargeable quickly, as well as has a long charge-discharge cycle length.

The conventional type of the electric double layered capacitor cell disclosed in Japanese Unexamined Patent Publication No. 3-203311A includes a bag-shaped soft case in which a plurality of positive electrodes and negative electrodes, and a separator are received together with an electrolytic solution to be laminated.

When this type of the electric double layered capacitor is mounted on a vehicle or the like, it is required that a plurality of the electric double layered capacitors are received in parallel in a hard case to form a capacitor module, which is connected to a substrate of a control circuit for unitizing.

However, the capacitor module needs a cooling system to circulate cooling air around the capacitor module by, for instance, an electric fan to ensure thermal radiation of the electric double layered capacitor received in the hard case, which results in increasing in complexity and growing in size.

An object of the present invention is to solve the above problems.

It is an object of the present invention to ensure a better cooling capability of a capacitor unit including a control substrate or the like.

SUMMARY OF THE INVENTION

An electric double layered capacitor according to the present invention comprises a capacitor cell including a bag-shaped soft case in which a plurality of positive electrodes and negative electrodes, and a separator are received together with an electrolytic solution to be laminated, a hard case for thermal radiation in which a plurality of the capacitor cells are received and laminated to be closely contacted with each other, and a thermal conductor interposed between the hard case and the capacitor cells.

Heat generated in the capacitor cells in accordance with charge and discharge of the capacitor cells is transmitted from the soft case to the hard case for thermal radiation by the thermal conductor and then transmitted from the hard case to an outside air to release the heat.

Further, an electric double layered capacitor according to the present invention comprises a plurality of capacitor cells in each of which includes in a bag-shaped soft case a plurality of positive electrodes and negative electrodes, and a separator are received together with an electrolytic solution to be laminated, a capacitor module to receive and laminate a plurality of the capacitor cells in a hard case for thermal radiation, a control box housing a control substrate to charge and discharge the capacitor cells, and a capacitor unit formed of connecting the control box to the capacitor module, wherein the hard case is exposed to an outside of the control box.

Since in the capacitor unit the control box is provided with the capacitor module and the hard case of the capacitor module is placed to be exposed to an outside of the control box, each capacitor module can be sufficiently cooled by exposing an exterior of the hard case to the outside air. Accordingly even when a plurality of the capacitor modules are connected to one control box, it is possible to control a rise in temperature at the capacitor module, to ensure an output performance and a durability thereof without any use of specific cooling system.

DETAILED DESCRIPTION OF THE PREFERRED EMBODIMENTS

Embodiments of the present invention are described below with reference to the accompanying drawings.

Figure 1:
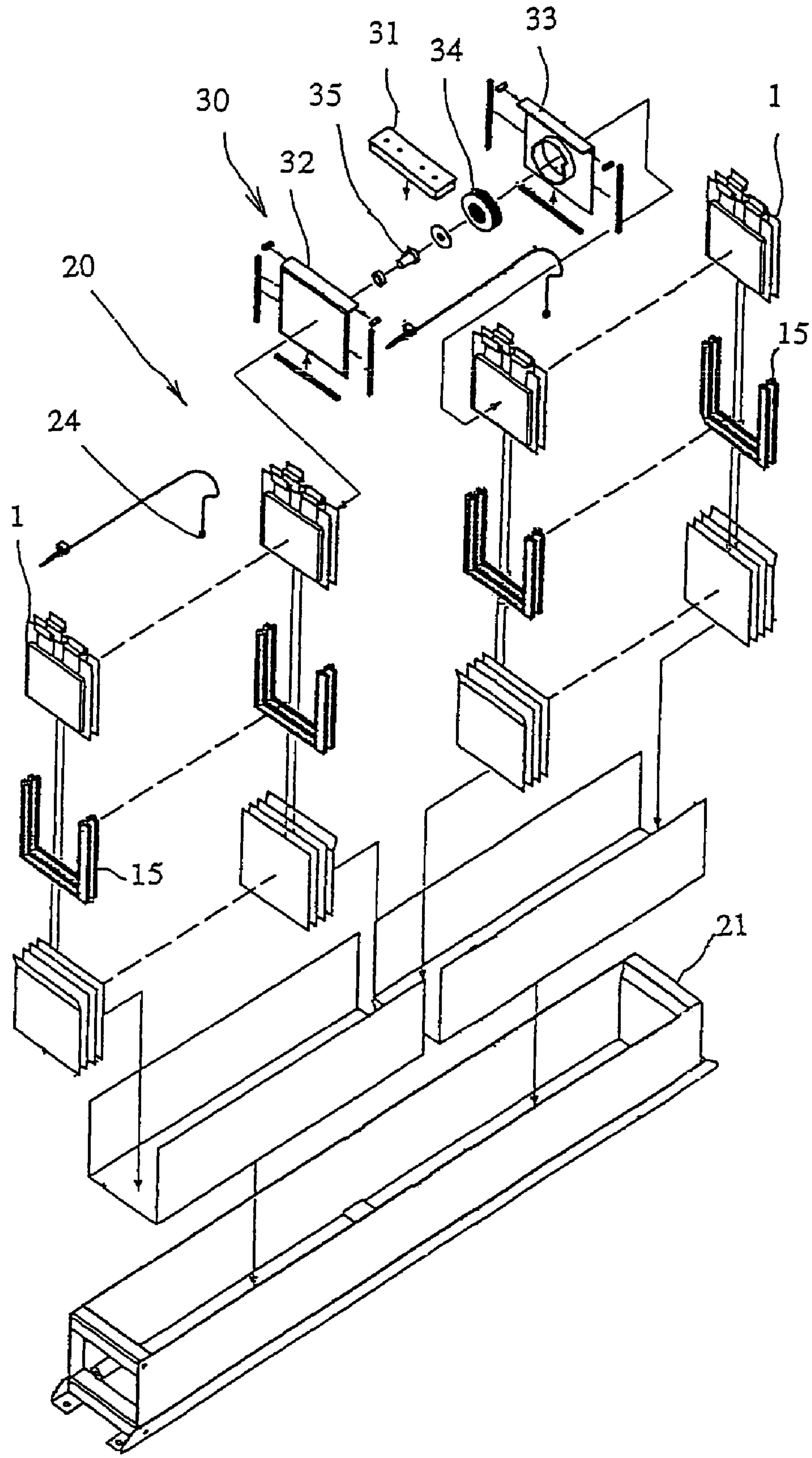
FIG. 1 is an exploded perspective view showing a capacitor module.
Figure 2A:
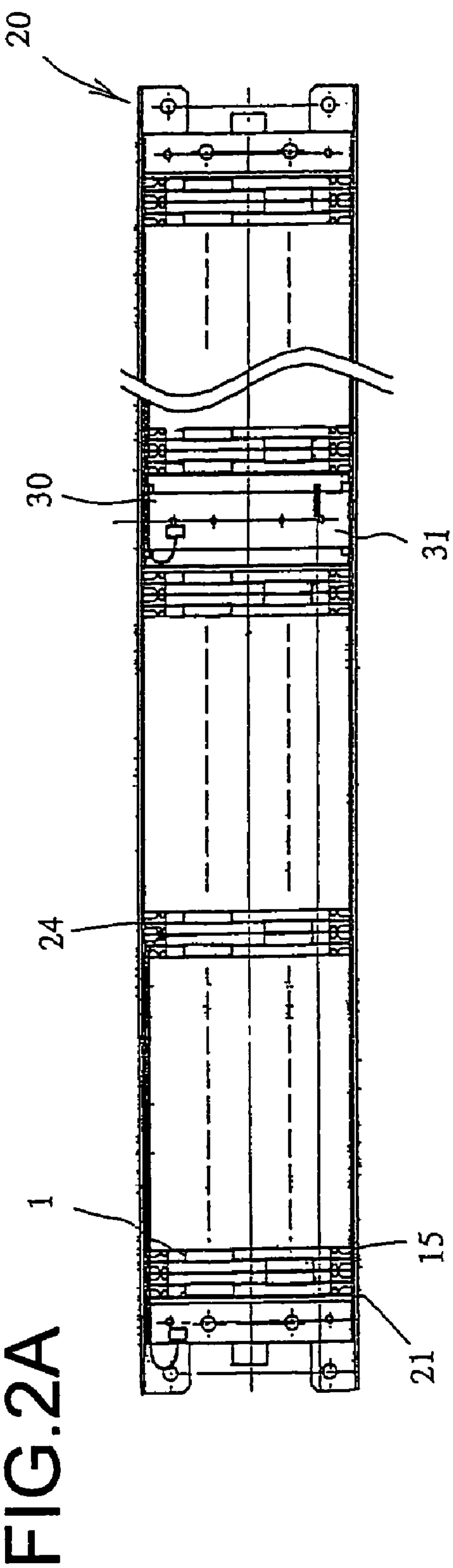
FIGS. 2A and 2B are a top view and a side view of the capacitor module.
Figure 2B:
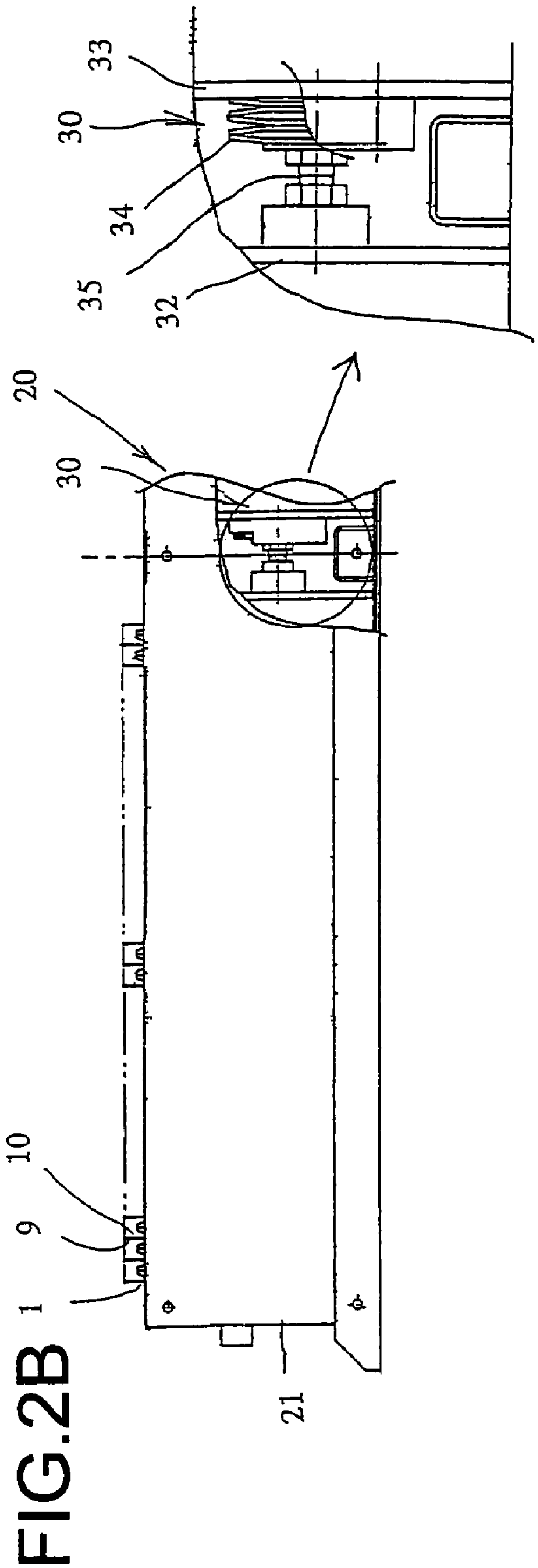

As shown in FIG. 1, FIG. 2A, and FIG. 2B, a plurality of electric double layered capacitor cells 1 are received and laminated in a hard case 21 for thermal radiation so that they are closely contacted with each other therein, which forms one capacitor module 20.

Figure 3:
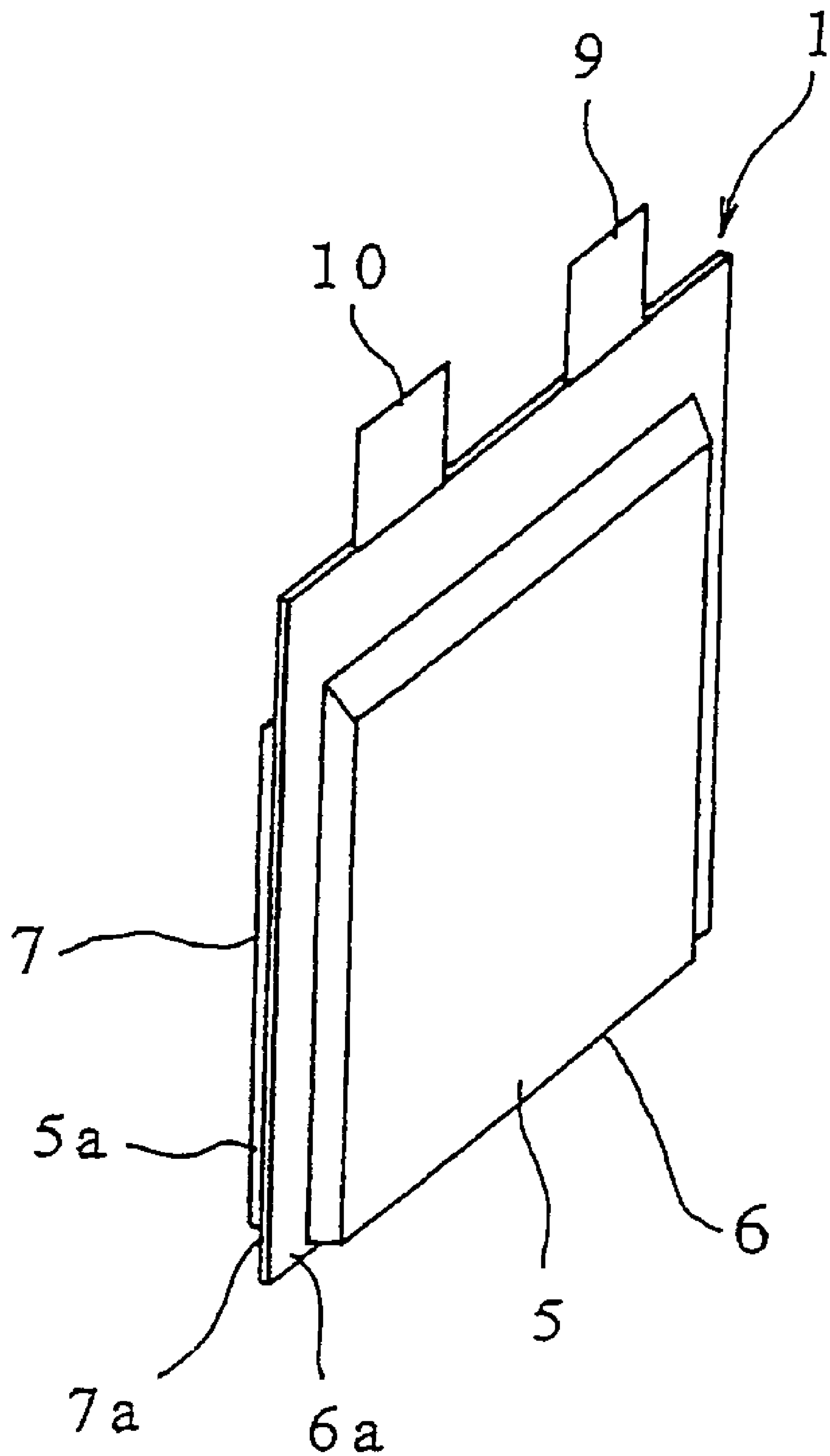
FIG. 3 is a perspective view showing a capacitor cell.

As shown in FIG. 3, each capacitor cell 1 includes a bag-shaped soft case 5 in which a positive electrode, a negative electrode and a separator (not shown) are received together with an electrolytic solution to be laminated.

The soft case 5 is formed by two elastic and laminated sheets 6 and 7 jointed in a bag shape. In the soft case 5, the flanges 6_a_ and 7_a_ of the sheets 6 and 7 are welded to form a belt-formed radiating fin 5_a_ surrounding the edge of the soft case 5. The radiating fin 5_a_ is formed wider than a weld part of the flanges 6_a_ and 7_a_ to release heat generated in a capacitor cell 1.

Terminal strips 9 and 10 of the electrodes to connect to the positive electrodes and the negative electrodes project from the upper side of the soft case 5.

Figure 4:
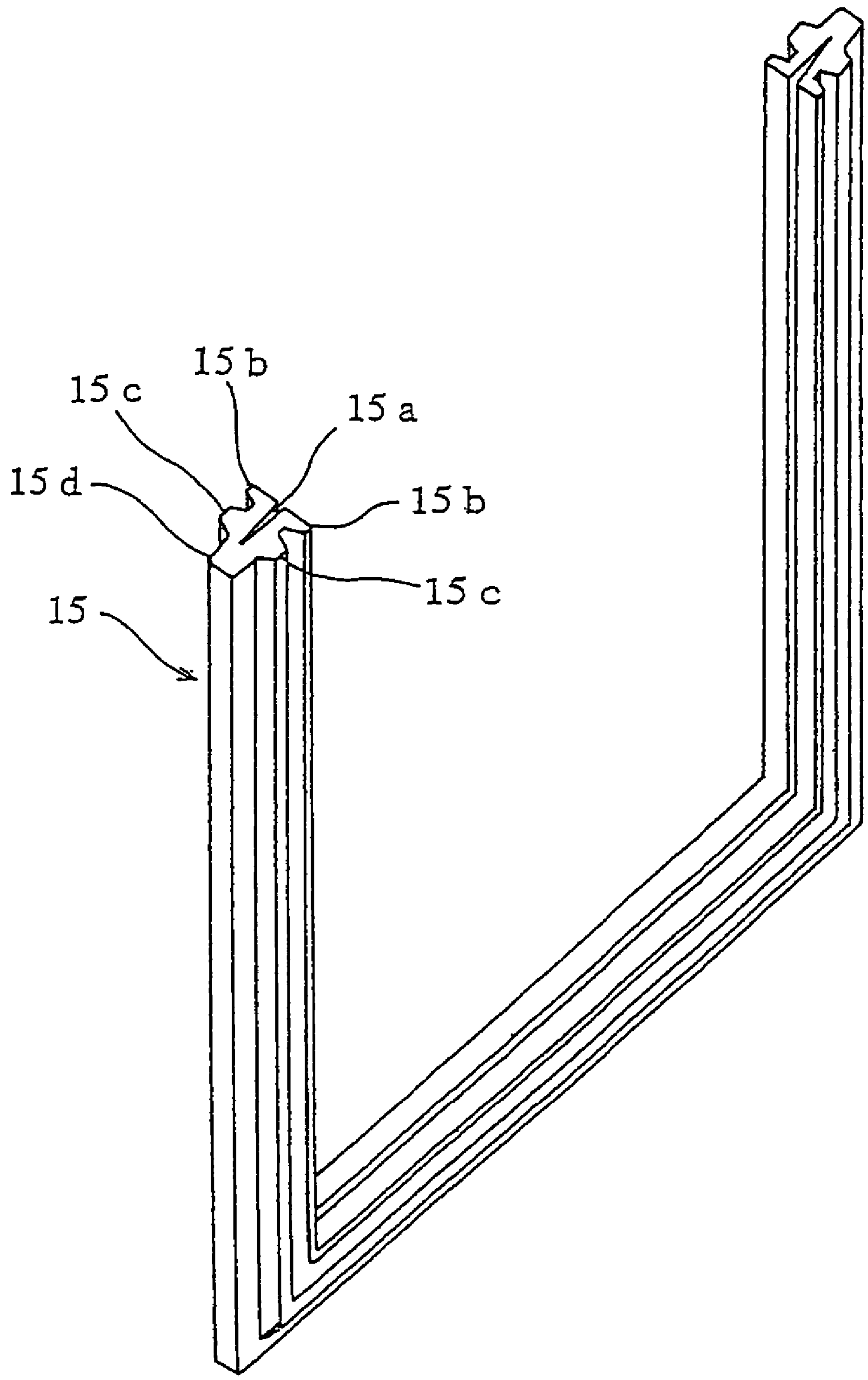
FIG. 4 is a perspective view showing an electric heat frame.

As shown in FIG. 4, a heat transfer frame 15 sandwiches the radiating fin 5_a_ surrounded by the soft case 5 from an outside of the radiating fin 5_a_ excluding a side of the terminal strips 9 and 10. The heat transfer frame 15 is made of a highly thermal conductivity material, for instance, a combined material which is formed of mixing metal powder such as aluminum into an elastic resin such as silicon.

The heat transfer frame 15 includes a slit 15_a_ to sandwich the radiating fin 5_a_, a pair of flanges 15_b_ disposed on both sides of the slit 15_a_ to join an end of the soft case 5, a pair of thick sandwiching members 15_c_ to press the slit 15_a_ from both sides, and a support member 15_d_ contacting the hard case 21 for thermal radiation to be supported, all of which are integrally produced by a resin mold-processing. Further, the heat transfer frame may be, not limited to the above, formed by jointing a plurality of members.

Figure 5:
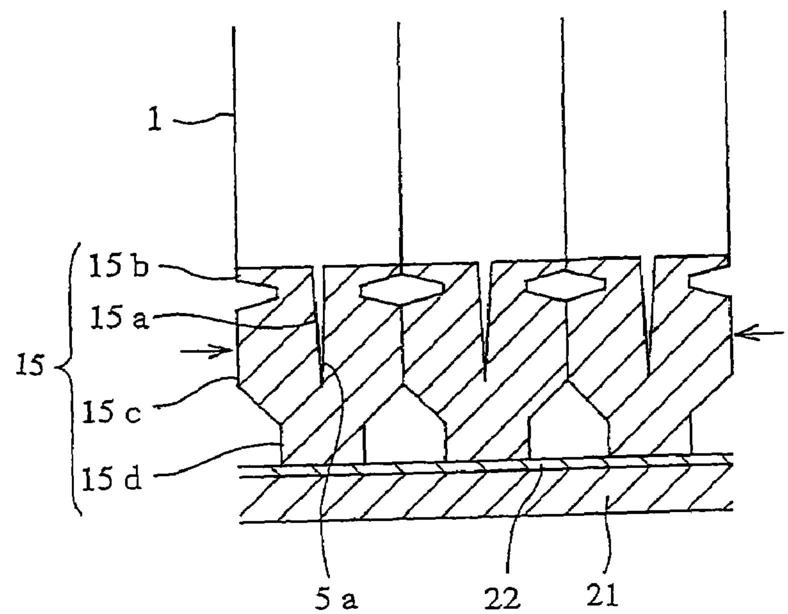
FIG. 5 is a cross sectional view showing the capacitor module.

As shown in FIG. 5, the capacitor cells 1 are mounted to the heat transfer frames 15, received and laminated in the hard case 21 for thermal radiation so that they are closely contacted in a line with each other therein. In the hard case 21 for thermal radiation, the heat transfer frames 15 mounted to the capacitor cells 1 are compressed by the neighboring heat transfer frames 15 to be deformed elastically, which results in that the flanges 15*b* of each heat transfer frame 15 being closely contacted to the ends of the soft case 5 with no clearance, the slit 15*a* of the heat transfer frame 15 being closely contacted to the radiating fin 5*a* with no clearance, as well as a rim of a support member 15*d* is being closely contacted to the inner surface of the hard case 21 for thermal radiation.

Therefore, the heat transfer frame 15 has functions of transmitting heat generated at the capacitor cell 1 from the radiating fin 5*a* to the hard case 21 for thermal radiation, elastically supporting the capacitor cell 1 to the hard case 21 for thermal radiation and electrically insulating the capacitor cell 1 to the hard case 21 for thermal radiation.

The cross sectional shape of the heat transfer frame 15 may be, not limited to this shape, for example, formed in a substantially simple rectangle-shape having a slit opened in an inside of the heat transfer frame 15.

Further, the heat transfer frame 15 is not limited to a frame that surrounds three sides of the radiating fin 5*a* with a top side of the frame being opened, but formed like a square frame that surrounds four sides of the radiating fin 5*a*. Further, the heat transfer frame 15 may be divided into four members corresponding to each side of the radiating fin 5*a*.

Figure 6:
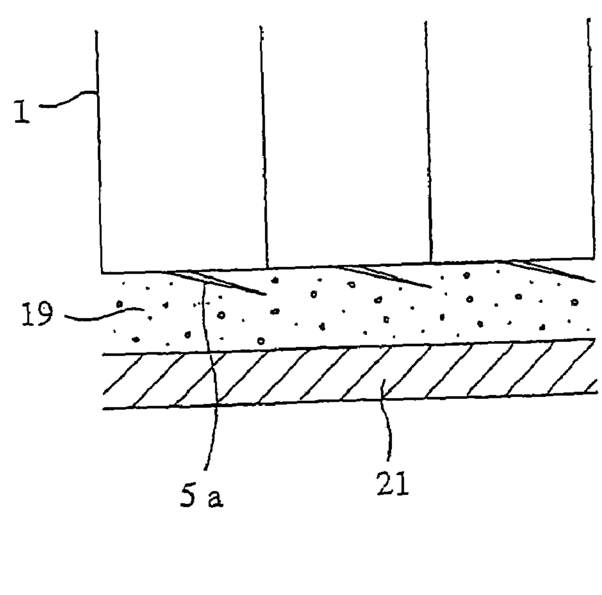
FIG. 6 is a cross sectional view showing a capacitor module according to another embodiment.

As shown in FIG. 6, instead of the heat transfer frame 15 functioning as a thermal conductor, a caulking compound 19 such as silicon may be filled between the soft case 5 and the hard case 21 for thermal radiation. The radiating fin 5*a* of the capacitor cell 1 is folded and wrapped with the caulking compound 19.

In this case, the caulking compound 19 has functions of conducting heat generated at the capacitor cell 1 from the radiating fin 5*a* to the hard case 21 for thermal radiation, elastically supporting the capacitor cell 1 to the hard case 21 for thermal radiation and electrically insulating the capacitor cell 1 to the hard case 21 for thermal radiation.

The hard case 21 for thermal radiation is, for instance, made of metal with a high thermal conductivity such as an aluminum material to actively release heat at each capacitor cell 1 to the open air.

As shown in FIG. 1 and FIG. 2, a plurality of the capacitor cells 1 are received in one hard case 21 for thermal radiation to form a capacitor module 20.

A pressure system 30 is provided at the midsection of the capacitor module 20 and presses each laminated capacitor cell 1 in the opposite direction so that they are closely contacted with each other. This urging force increases a density of an active carbon layer including a positive electrode and a negative electrode of the capacitor cell 1, thereby enhancing charge and discharge efficiencies. The capacitor cells 1 are also closely received in the hard case 21 for thermal radiation so as to be held under compression to prevent the capacitor cells 1 from deviating due to vibrations or impulses.

The pressure system 30 is disposed at such a place that a plurality of capacitor cells 1 are equally divided into two in the laminated direction, in which one group of a plurality of capacitor cells 1 are pressurized between one end of the hard case 21 for thermal radiation and the pressure system 30, while the other group of a plurality of the capacitor cells 1 are pressurized between the other end of the hard case 21 for thermal radiation and the pressure system 30. Like this, one pressure system 30 simultaneously pressurizes two capacitor cell groups, which results in that one pressure system 30 allows many capacitor cells 1 to be pressurized, to reduce the number of the pressure systems 30 disposed in the capacitor module 20.

Further, the position of the pressure system 30 is not limited to a place where the capacitor cells are divided equally, but may be provided in a place where the capacitor cells are divided into groups of a predetermined ratio as needed.

The pressure system 30 includes a stopper board 31 secured on top of the hard case 21 for thermal radiation, a pair of push plates 32 and 33 which are surrounded by the stopper board 31 and the hard case 21 for thermal radiation, as well as are slidable in the laminated direction, a belleville spring 34 disposed between these push plates 32 and 33, as well as to urge them in the direction to separate these push plates from each other, a setting bolt 35 to adjust a spring load of the belleville spring 34 and the like.

Therefore, the spring load of the belleville spring 34 can be freely adjusted by the setting bolt 35 increasingly or decreasingly such that extending the setting bolt 35 increases the spring load of the belleville spring 34, which results in that the force of urging the push plates 32 and 33 from each other increases, while shortening the setting bolt 35 decreases the force of urging the push plates 32 and 33.

Figure 7:
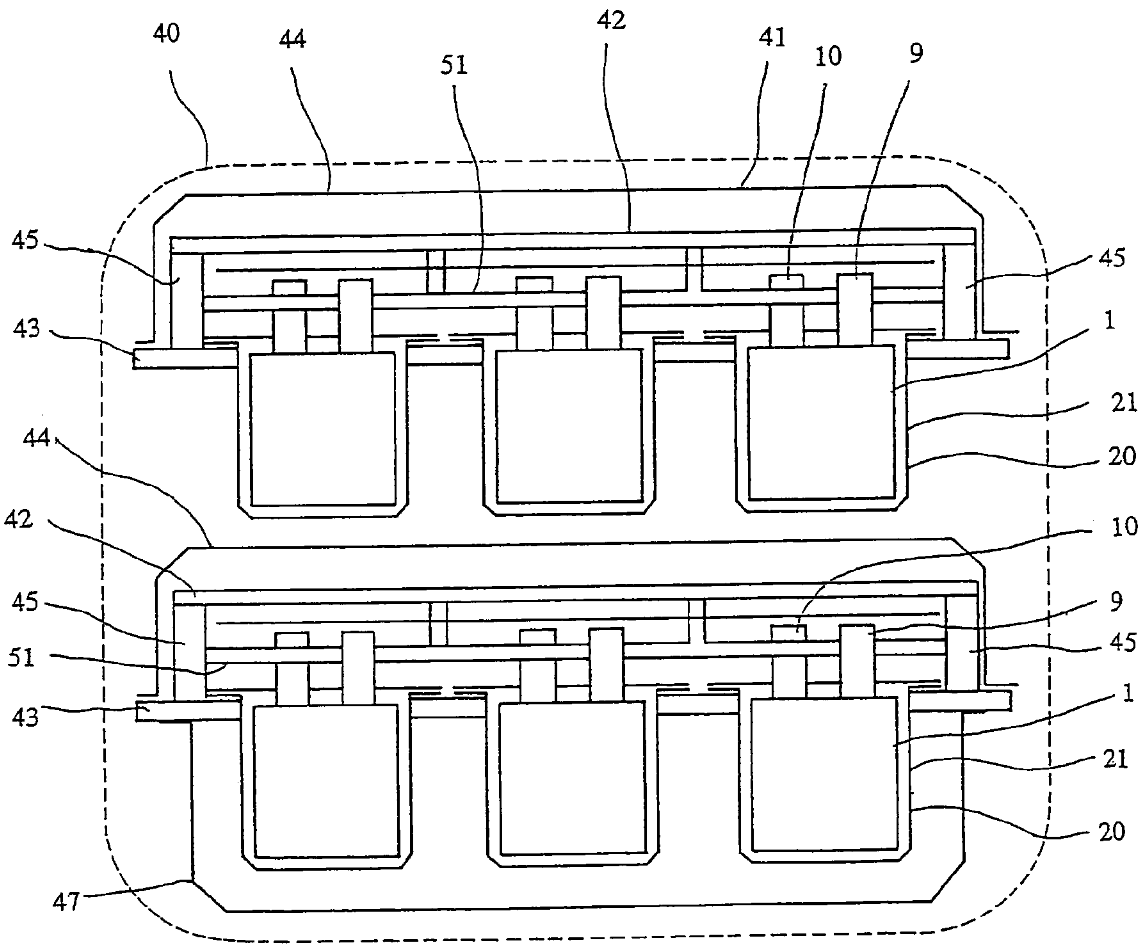
FIG. 7 is a construction view showing a capacitor unit.

FIG. 7 is a construction view showing a capacitor unit 40.

The capacitor unit 40 is formed by a combination of the capacitor module 20 and a control box 41 housing a control substrate 42 to control storage and discharge of electricity in the capacitor module 20.

In this embodiment, three capacitor modules 20 disposed in parallel are paired with one control box 41 to form one capacitor unit 40 and two capacitor units 40 are overlapped one above the other to form a capacitor device.

The control box 41 housing the control substrate 42 is equipped with a base board 43 having the strength needed as a structural member. The control substrate 42 is mounted on the base board 43 by an electrically insulated support member 45. A box shaped cover 44 is mounted on top of the base board 43 and covers the control substrate 42.

Each capacitor module 20 is joined to the base board 43 of the control box 41. Each capacitor module 20 is mounted to the base board 43 so that the terminal strips 9 and 10 of electrodes are received in the control box 41, as well as are positioned under the control substrate 42.

The hard case 21 for thermal radiation of each capacitor module 20 is exposed to an outside of the control box 41 so that the outer surface of the hard case 21 for thermal radiation opens directly to an outside air.

The three capacitor modules 20 disposed in parallel under one of the control boxes 41 have an opening of which size corresponds to a size of each hard case 21 for thermal radiation, in which the hard case 21 is engaged to be secured and supported to the control box 41 by hanging from the control box 41.

Each hard case 21 for thermal radiation exposed to an outside of the control box 41 is disposed in parallel at a predetermined interval from each other. When the capacitor unit 40 is mounted on a vehicle, each hard case 21 for thermal radiation is disposed to extend in the front-rear directions of the vehicle and a traveling wind (an outside air) flows between each of the hard cases 21 for thermal radiation to cool each hard case 21 equally.

When the two capacitor units 40 disposed above and below each other are mounted on the vehicle, the capacitor units are fixedly supported by a support frame disposed on the vehicle body side (not shown) at a predetermined interval in an upward and downward directions. In this case, the base board 43 area of the control box 41 is secured by the support frame. Further, there is provided an under guard 47 surrounding each hard case 21 for thermal radiation of the lower-side capacitor unit 40 for protection thereof.

Inside the control box 41 for each capacitor unit 40 each of the terminal strips 9 and 10 of the three capacitor modules 20 and the control substrate 42 are electrically linked by a plurality of the bus bars 51.

The bus bar 51 extending across over three capacitor modules 20 and made of a conductive metal is disposed under the control substrate 42. A plurality of bus bars 51 corresponding to the capacitor cells 1 each are disposed in the laminated direction of the capacitor cells 1 at equal intervals.

In each capacitor module 20, many capacitor cells 1 are arranged so as to be laminated by sequentially connecting each of the neighboring capacitor cells in series. With this, the capacitor cells 1 each are placed alternately in direction, whereby the terminal strips are faced with the different electrodes. Namely, as understood by referring to FIG. 8, a terminal strip 9 of a certain cell and the terminal strip 10 of the neighboring cell are faced each other, wherein the faced terminal strips are directly connected with each other or connected through the bus bar 51.

In this embodiment, each terminal strip 9, 9, 9 of the capacitor cell received in each of the three capacitor module 20 respectively is connected to each bus bar 51, while other terminal strips 10, 10, 10 are connected to the neighboring bus bar 51, and the three capacitor cells 1 are electrically connected in parallel over each capacitor module 20.

Both ends of each bus bar 51 are supported by the insulated support member 45 and a midpoint of the bus bar 51 is supported by the control substrate 42 through an electrically insulated support member. A boss made of a conductive member is welded at a midpoint of the bus bar 51 to electrically connect the control substrate 42 to the bus bar 51, and the control substrate 42 is fastened to each boss by an electrical screw. The control substrate 42 is mechanically fastened to the bus bar 51 by the bosses and the screws, as well as the bus bar 51 is electrically conducted to the control circuit of the control substrate 42.

Figure 8:
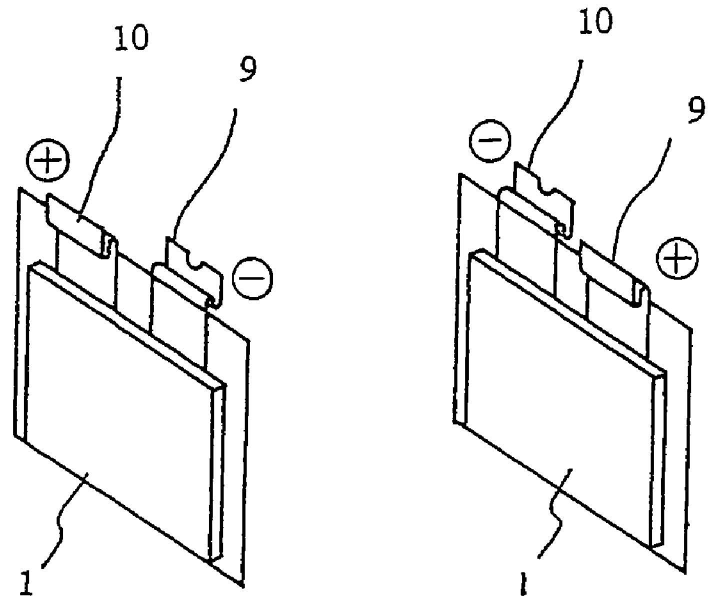
FIG. 8 is a perspective view showing the capacitor cell.
Figure 9:
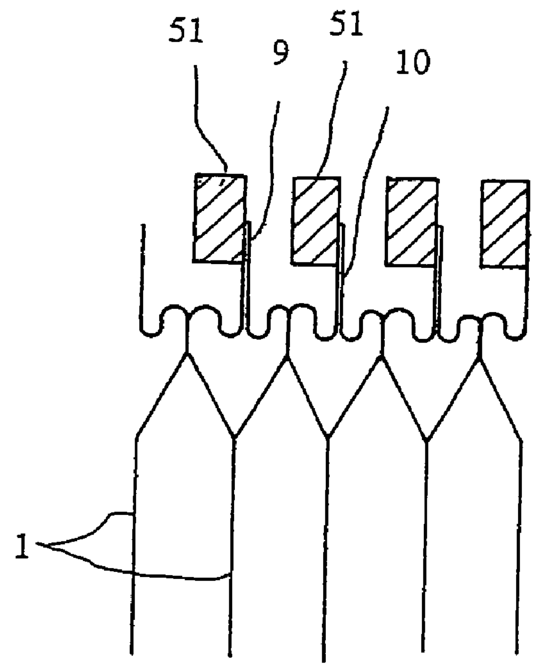
FIG. 9 is a cross sectional view showing the capacitor cell and a bus bar.

Herein, as shown in FIGS. 8 and 9, the terminal strips 9 and 10 of each electrode at the capacitor cells 1 may be curved.

Namely, the terminal strips 9 and 10 of each electrode at the capacitor cells 1 are curved in s-shape at cross section to the laminated direction of the capacitor cells, and each terminal strip 9 and 10 of the neighboring capacitor cell is disposed in the laminated direction of the capacitor cell is joined, as well as is welded to each bus bar 51.

Therefore, in each capacitor module 20, a plurality of the capacitor cells 1 are electrically connected in series, as well as the three capacitor modules 20 are also connected to each other in parallel.

Since the terminal strips 9 and 10 made of aluminum are curved to connect to the bus bar 51, a displacement of the capacitor cell 1 in the laminated direction of the capacitor cell 1 to the bus bar 51 is easily absorbed by an elastic deformation of each of the terminal strips 9 and 10, thereby to prevent a rupture even when a joining section of each terminal strip 9, 10 and the bus bar 51 is overloaded by a mechanical vibration and a thermal deformation.

The control circuit mounted to the control substrate 42 may charge so that a voltage of each capacitor cell 1 does not exceed a predetermined value, as well as control an equalization of the voltage stored at each capacitor cell 1.

As constructed above, in the present invention, heat generated in the capacitor cell 1 caused by charge and discharge of the capacitor cell 1 is transmitted from the radiating fin 5*a* of the soft case 5 to the hard case 21 for thermal radiation through the heat transfer frame 15 and then transmitted from the hard case 21 for thermal radiation to the outside air.

Further, the hard case 21 for thermal radiation is projected from the control box 41 downwardly and exposed to the outside air, which results in that each capacitor cell 1 can be sufficiently cooled.

Accordingly, a temperature increase can be controlled without cooling the periphery of the capacitor module needed by the conventional type of the specific cooling system, and therefore the cooling system becomes unnecessary, which results in facilitating a simplification in the construction of the capacitor unit.

Three capacitor modules 20 are disposed in a row per one control box 41, which enables both to ensure a cooling capability of each capacitor module 20 as well as to reduce the size of the capacitor unit 40.

It is to be noted that four or more capacitor modules 20 may be disposed in a row per one control box 41.

While the present invention is not limited by any of the details of description as described the above, it is understood that various improvements and modifications may be made within the scope of the present inventive concepts described in the following claims.

INDUSTRIAL FIELD OF APPLICATION

As described the above, the electric double layered capacitor according to the present invention may be applied for various types of capacitors including a capacitor used for a hybrid car or a wind power facility.

What is claimed is:

1. An electric double layered capacitor, comprising:

a capacitor cell including a bag-shaped soft case in which a plurality of positive electrodes and negative electrodes, and a separator are received and laminated together with an electrolytic solution;

a hard case for thermal radiation in which a plurality of the capacitor cells are received and laminated to be closely contacted with each other; and a thermal conductor interposed between the hard case and the capacitor cells; wherein:

a belt-shaped radiating fin is disposed at a rim of the soft case so as to be extended therefrom; and the thermal conductor comprises a heat transfer frame placed at a periphery of the soft case, the heat transfer frame sandwiching the radiating fin.

2. The electric double layered capacitor as defined in claim 1, wherein:

the heat transfer frame is made of an elastic resin and thereby the neighboring heat transfer frames are compressed with each other to be closely contacted.

3. The electric double layered capacitor as defined in claim 2, wherein:

the heat transfer frame is made by mixing with the elastic resin metal powder with a high thermal conductivity.

4. The electric double layered capacitor as defined in claim 3, wherein:

the metal powder comprises aluminum.

5. An electric double layered capacitor, comprising:

a capacitor cell including a bag-shaped soft case in which a plurality of positive electrodes and negative electrodes, and a separator are received and laminated together with an electrolytic solution;

a hard case for thermal radiation in which a plurality of the capacitor cells are received and laminated to be closely contacted with each other; and a thermal conductor interposed between the hard case and the capacitor cells; wherein:

a belt-shaped radiating fin is disposed at a rim of the soft case so as to be extended therefrom; and the thermal conductor comprises a caulking compound filled between the soft case and the radiating fin to wrap the radiating fin.

6. An electric double layered capacitor comprising:

a bag-shaped soft case in which a plurality of positive electrodes and negative electrodes, and a separator are received and laminated together with an electrolytic solution;

a capacitor cell provided with the soft case;

a capacitor module to receive and laminate a plurality of the capacitor cells in a hard case for thermal radiation;

a control box receiving a control substrate to control charge and discharge of the capacitor cells; and a capacitor unit formed of connecting the control box to the capacitor module, wherein:

the hard case is exposed to an outside of the control box.

7. The electric double layered capacitor as defined in claim 6, wherein:

a plurality of the capacitor modules are arranged in parallel to the one control box.

8. The electric double layered capacitor as defined in claim 7, further comprising:

a bus bar disposed in the control box to extend over the respective capacitor modules, wherein:

the capacitor cells received in each capacitor module are connected in parallel by the bus bar; and the bus bar is connected to the control substrate.

9. The electric double layered capacitor as defined in claim 8, wherein:

each of the capacitor cells arranged so as to be laminated in the capacitor module is connected in series each other by the bus bar.

10. The electric double layered capacitor as defined in claim 8, wherein:

the capacitor cells include each terminal strip to connect the positive electrodes and negative electrodes to the bus bar; and the each terminal strip is curved in the laminated direction of the capacitor cells to absorb a displacement of the capacitor cells to the bus bar.

* * * * *